US012580353B2

(12) United States Patent
Qin et al.

(10) Patent No.: US 12,580,353 B2
(45) Date of Patent: Mar. 17, 2026

(54) ELECTRICAL CONNECTOR ASSEMBLY WITH AUTOMATIC RETURN FUNCTION

(71) Applicant: Shanxi Luxshare Precision Industry, Ltd., Changzhi City (CN)

(72) Inventors: Yaning Qin, Changzhi City (CN); Zhimiao Zheng, Changzhi City (CN); Yuzhong Wang, Changzhi City (CN); Rui Li, Changzhi City (CN); Kai Xie, Changzhi City (CN)

(73) Assignee: SHANXI LUXSHARE PRECISION INDUSTRY, LTD., Changzhi City (CN)

( * ) Notice: Subject to any disclaimer, the term of this patent is extended or adjusted under 35 U.S.C. 154(b) by 497 days.

(21) Appl. No.: 18/113,973

(22) Filed: Feb. 24, 2023

(65) Prior Publication Data

US 2024/0039222 A1 Feb. 1, 2024

(30) Foreign Application Priority Data

Jul. 26, 2022 (CN) ......................... 202210882861.1

(51) Int. Cl.

*H01R 24/60* (2011.01)
*H01R 13/04* (2006.01)
*H01R 13/62* (2006.01)
*H01R 13/66* (2006.01)
*H01R 35/00* (2006.01)

(52) U.S. Cl.

CPC ............ *H01R 24/60* (2013.01); *H01R 13/04* (2013.01); *H01R 13/6205* (2013.01); *H01R 13/665* (2013.01); *H01R 35/00* (2013.01)

(58) Field of Classification Search

CPC .... H01R 24/60; H01R 13/6205; H01R 35/04; H01R 13/04; H01R 13/655; H01R 35/00
USPC .......................................................... 439/660
See application file for complete search history.

(56) References Cited

U.S. PATENT DOCUMENTS 10,355,402 B2 7/2019 Degner et al.
2010/0331060 A1* 12/2010 Yoshida ................ H01R 35/00 174/254

(Continued)

FOREIGN PATENT DOCUMENTS

CN 101971428 A 2/2011
CN 104934834 A 9/2015

(Continued)

*Primary Examiner* — Abdullah A Riyami
*Assistant Examiner* — Amara Anderson
(74) *Attorney, Agent, or Firm* — Birch, Stewart, Kolasch & Birch, LLP

(57) ABSTRACT

An electrical connector assembly includes a housing, a connector rotating unit and a second magnetic attraction element. The connector rotating unit is rotatable relative to the housing under action of an external force. The connector rotating unit includes a rotating body, a first magnetic attraction element fixed to the rotating body, and an electrical connector fixedly connected to the rotating body. The second magnetic attraction element is disposed in the housing. The second magnetic attraction element is configured to attract the first magnetic attraction element to rotate the connector rotating unit automatically back to an original position after the connector rotating unit is rotated and the external force is released.

20 Claims, 13 Drawing Sheets

(56) References Cited

U.S. PATENT DOCUMENTS

| | | | | |
|---|---|---|---|---|
| 2012/0282805 | A1* | 11/2012 | Ku | H01R 35/02 439/586 |
| 2016/0285214 | A1* | 9/2016 | Chen | H01R 27/00 |
| 2017/0093096 | A1 | 3/2017 | Huang et al. | |
| 2019/0103701 | A1 | 4/2019 | Degner et al. | |
| 2020/0014144 | A1 | 1/2020 | Degner et al. | |
| 2021/0194194 | A1* | 6/2021 | Piotrowski | H01R 13/633 |
| 2022/0021228 | A1* | 1/2022 | Yan | H01R 35/04 |
| 2024/0088598 | A1* | 3/2024 | Allaway | H01R 35/02 |

FOREIGN PATENT DOCUMENTS

| | | | |
|---|---|---|---|
| CN | 212085281 | U | 12/2020 |
| DE | 20 2022 000 472 | U1 | 4/2022 |
| JP | 2012-45631 | A | 3/2012 |
| KR | 10-2006-0075152 | A | 7/2006 |
| KR | 10-2015-0084212 | A | 7/2015 |
| TW | M454008 | U1 | 5/2013 |
| TW | 201916475 | A | 4/2019 |
| TW | M628990 | U | 7/2022 |

* cited by examiner

ELECTRICAL CONNECTOR ASSEMBLY WITH AUTOMATIC RETURN FUNCTION

CROSS-REFERENCE TO RELATED APPLICATION

This patent application claims priority of a Chinese Patent Application No. 202210882861.1, filed on Jul. 26, 2022 and titled "ELECTRICAL CONNECTOR ASSEMBLY, the entire content of which is incorporated herein by reference.

TECHNICAL FIELD

The present disclosure relates to an electrical connector assembly, which belongs to a technical field of connectors.

BACKGROUND

An electrical connector assembly in the related art includes a cable, an electrical connector connected to the cable, and a housing located outside the electrical connector. In some applications, the electrical connector needs to be able to rotate at a certain angle to better mate with a mating connector. However, how to return the electrical connector back to its original position is a technical problem to be solved by those skilled in the art.

SUMMARY

An object of the present disclosure is to provide an electrical connector assembly with a function of returning to an original/normal position.

In order to achieve the above object, the present disclosure adopts the following technical solution: an electrical connector assembly, including: a housing; a connector rotating unit, the connector rotating unit being rotatable relative to the housing under action of an external force, the connector rotating unit including a rotating body, a first magnetic attraction element fixed to the rotating body, and an electrical connector fixedly connected to the rotating body, the electrical connector at least partially extending beyond the housing; and a second magnetic attraction element provided in the housing, the second magnetic attraction element being configured to be attracted to the first magnetic attraction element to rotate the connector rotating unit back to an original position after the connector rotating unit is rotated and the external force is released.

In order to achieve the above object, the present disclosure adopts the following technical solution: an electrical connector assembly, including: a housing defining a slot extending in a first direction; a connector rotating unit, the connector rotating unit being rotatable relative to the housing under action of an external force, the connector rotating unit including a rotating body, a first magnetic attraction element and an electrical connector fixedly connected to the rotating body, the electrical connector at least partially passing through the slot so as to extend beyond the housing in a second direction perpendicular to the first direction; and a second magnetic attraction element provided in the housing; wherein the connector rotating unit is rotatable between an original position and a rotated position; when no external force is applied, the connector rotating unit is located in the original position; when the external force is applied, the connector rotating unit is driven to rotate from the original position to the rotated position; and when the external force is released, under action of a magnetic force generated by mutual attraction between the first magnetic attraction element and the second magnetic attraction element, the connector rotating unit rotates from the rotated position back to the original position.

Compared with the prior art, the present disclosure is provided with a first magnetic attraction element and a second magnetic attraction element. The second magnetic attraction element is configured to attract the first magnetic attraction element so that the connector rotating unit can be automatically rotated back to the original position after the connector rotating unit is rotated and the external force is released.

DETAILED DESCRIPTION

Figure 1:
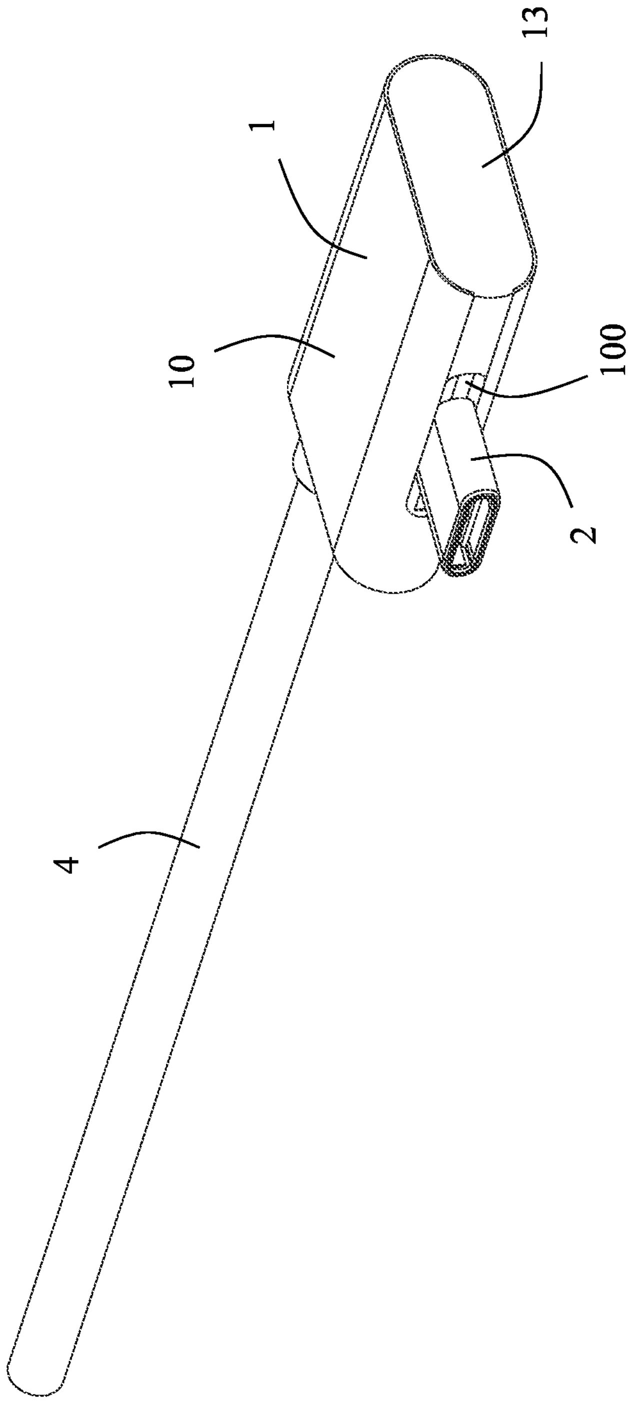
FIG. 1 is a schematic perspective view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 11, a first embodiment of the present disclosure discloses an electrical connector assembly, which includes a housing 1, a connector rotating unit 2, a plurality of magnets and a cable 4. In the illustrated embodiment of the present disclosure, the housing 1 includes an outer housing 10, a first housing 11, a second housing 12, and a side housing 13. The first housing 11 is mated with the second housing 12. Both the first housing 11 and the second housing 12 are located in the outer housing 10. The side housing 13 is at least partially inserted into the outer housing 10 from one side and locked with the outer housing 10.

The housing 1 defines a slot 100 extending in a first direction A1-A1. In the illustrated embodiment of the present disclosure, part of the slot 100 is provided in the outer housing 10, and another part of the slot 100 is provided in the side housing 13. In other words, the slot 100 is jointly formed by the outer housing 10 and the side housing 13.

The connector rotating unit 2 is rotatable relative to the housing 1 under action of an external force. In the first embodiment of the present disclosure, the connector rotating unit 2 includes a rotating body 21, a first magnetic attraction element fixed to the rotating body 21, an electrical connector 23 fixedly connected to the rotating body 21, and a built-in circuit board 24 connected to the electrical connector 23. The electrical connector 23 passes through the slot 100 in a second direction A2-A2 perpendicular to the first direction A-A1 to at least partially extend beyond the housing 1. It should be noted that the technical term "magnetic attraction element" used in the present disclosure is intended to indicate that the element can attract or repel a corresponding element by utilizing the principle of a magnetic field. In an embodiment of the present disclosure, the first magnetic attraction element is the first magnet 22.

It is understandable to those skilled in the art that, in an embodiment of the present disclosure, a pivot (not shown) is provided between the rotating body 21 and the housing 1. The rotating body 21 is rotatable relative to the housing 1 with the pivot as a center of rotation. Of course, in other embodiments, the rotating body 21 can also rotate relative to the housing 1 by means of other structural designs, which will not be repeated in the present disclosure.

Figure 10:
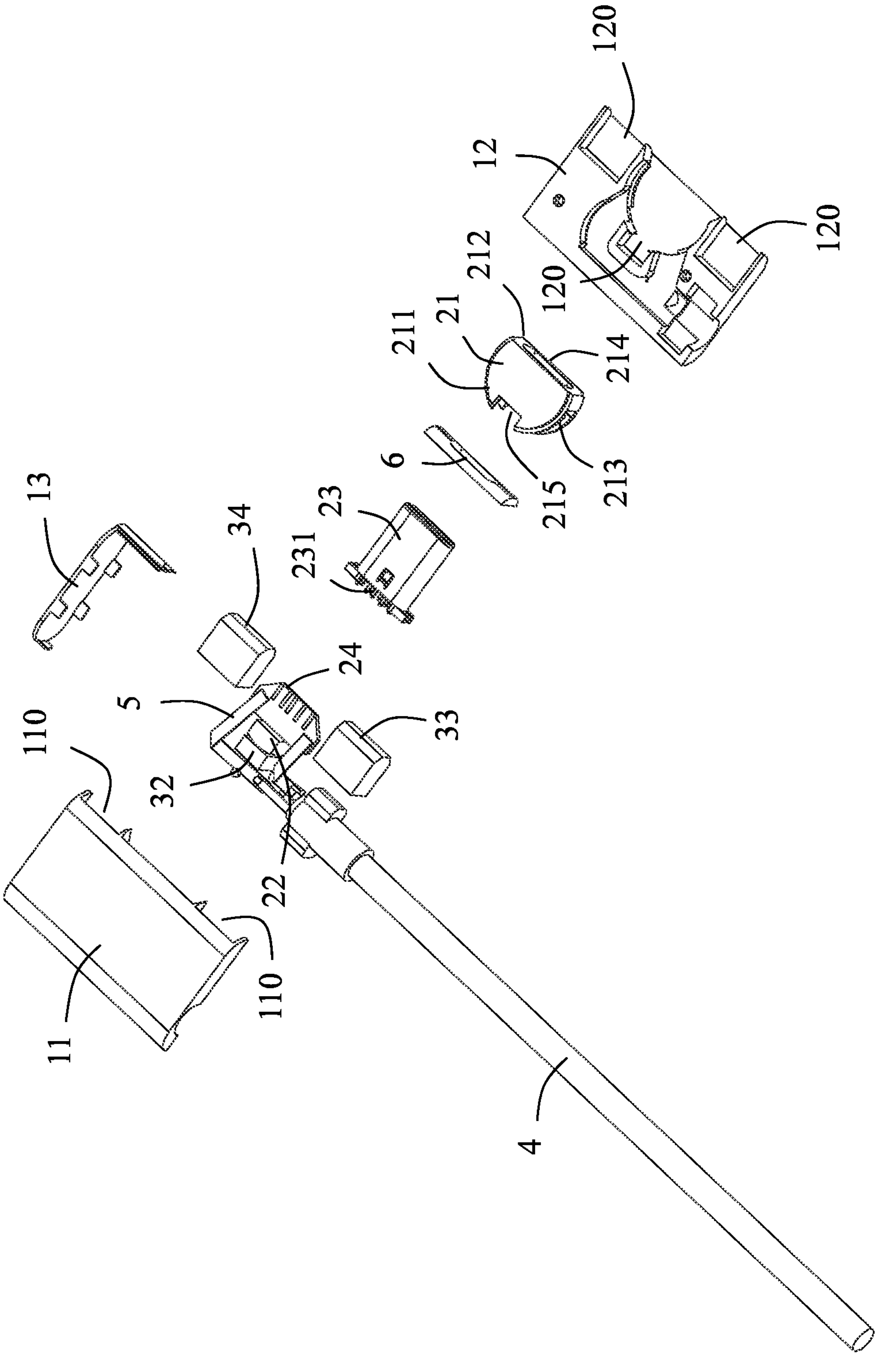
FIG. 10 is an exploded perspective view of the electrical connector assembly of the present disclosure.
Figure 11:
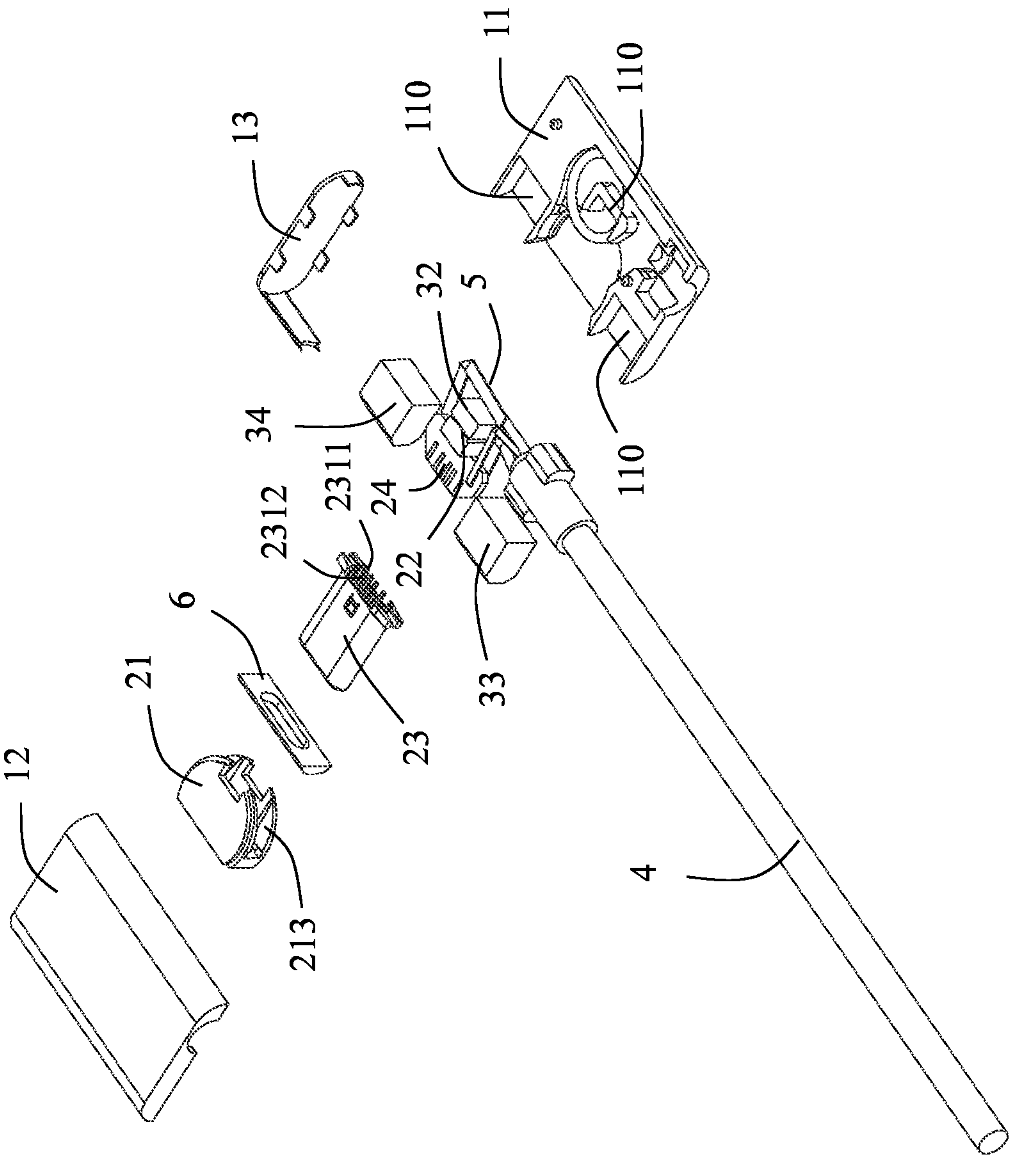
FIG. 11 is a perspective exploded view of FIG. 10 from another angle.

Referring to FIG. 10 and FIG. 11, the rotating body 21 is roughly in the shape of "D", which includes an arc surface 211, a flat surface 212, a receiving groove 213 extending through the arc surface 211, and an opening slot 214 extending through the flat surface 212. The opening slot 214 communicates with the receiving groove 213. The rotating body 21 further includes a groove 215 recessed from the top of the arc surface 211 toward the flat surface 212.

The first magnet 22 is detachably installed in the groove 215. The first magnet 22 is provided with an arcuate surface 221. The arcuate surface 221 is adapted to the arc surface 211.

Referring to FIG. 10 and FIG. 11, in the illustrated embodiment of the present disclosure, the electrical connector 23 is a connector plug (e.g., a USB Type C plug), which includes a plurality of conductive terminals 231. The plurality of conductive terminals 231 protrude toward the built-in circuit board 24 in a cantilevered manner. The plurality of conductive terminals 231 include a first row of conductive terminals 2311 and a second row of conductive terminals 2312. In the embodiment shown in the present disclosure, the first row of conductive terminals 2311 and the second row of conductive terminals 2312 are staggered along the first direction A1-A1.

The built-in circuit board 24 is sandwiched between the first row of conductive terminals 2311 and the second row of conductive terminals 2312. The first row of conductive terminals 2311 and the second row of conductive terminals 2312 are electrically connected (e.g., welded or soldered or abutted) to the built-in circuit board 24. The built-in circuit board 24 is accommodated in the receiving groove 213 of the rotating body 21. The plurality of conductive terminals 231 pass through the opening slot 214 of the rotating body 21 to be electrically connected to the built-in circuit board 24.

Referring to FIG. 6 to FIG. 9, the cable 4 includes a plurality of conductive portions 41. The electrical connector assembly also includes a plurality of flexible flat wires 5. One end of each flexible flat wire 5 is electrically connected (e.g., welded or soldered) to a corresponding conductive portion 41. Another end of each flexible flat wire 5 is electrically connected (e.g., welded or soldered) to the built-in circuit board 24. In other words, the cable 4 is electrically connected to the built-in circuit board 24 through the flexible flat wires 5 as a transition.

Specifically, in the embodiments shown in the present disclosure, the plurality of flexible flat wires 5 include a first flexible flat wire 51 and a second flexible flat wire 52. The plurality of conductive portions 41 include a first conductive portion 411 and a second conductive portion 412. The first flexible flat wire 51 includes a first connection portion 511 connected to the first conductive portion 411 and a second connection portion 512 connected to the built-in circuit board 24. The second connection portion 512 is connected to the first connection portion 511 in a folded manner so that the second connection portion 512 and the first connection portion 511 are located in different planes. Similarly, the second flexible flat wire 52 includes a third connection portion 521 connected to the second conductive portion 412 and a fourth connection portion 522 connected to the built-in circuit board 24. The fourth connection portion 522 is connected to the third connection portion 521 in a folded manner, so that the fourth connection portion 522 and the third connection portion 521 are located in different planes.

In the present disclosure, by arranging the plurality of flexible flat wires 5, the flexible flat wires 5 can be stably connected to the built-in circuit board 24 by virtue of the flexibility of the flexible flat wires 5 when the connector rotating unit 2 rotates. Thus, the electrical connection between the cable 4 and the built-in circuit board 24 is ensured.

Figure 2:
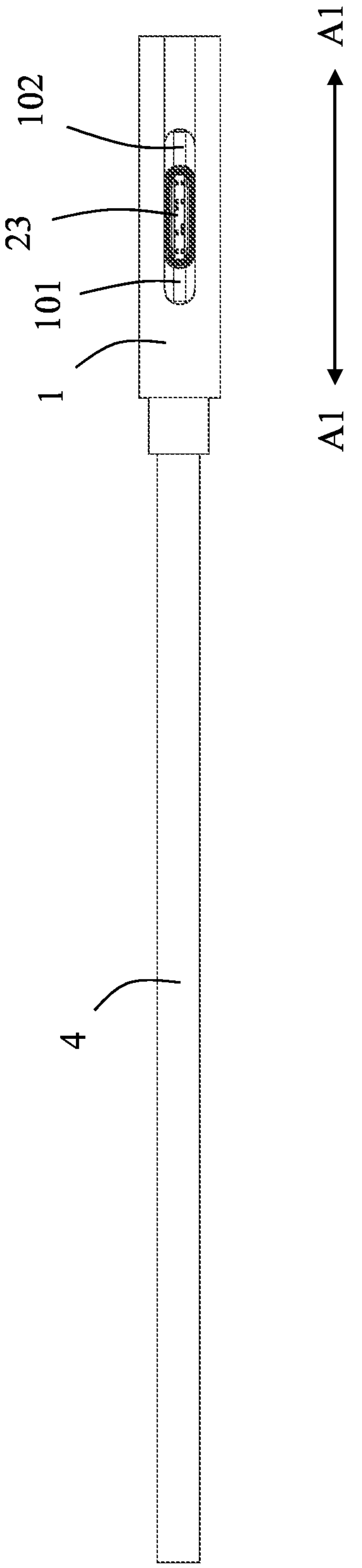
FIG. 2 is a front view of FIG. 1.
Figure 3:
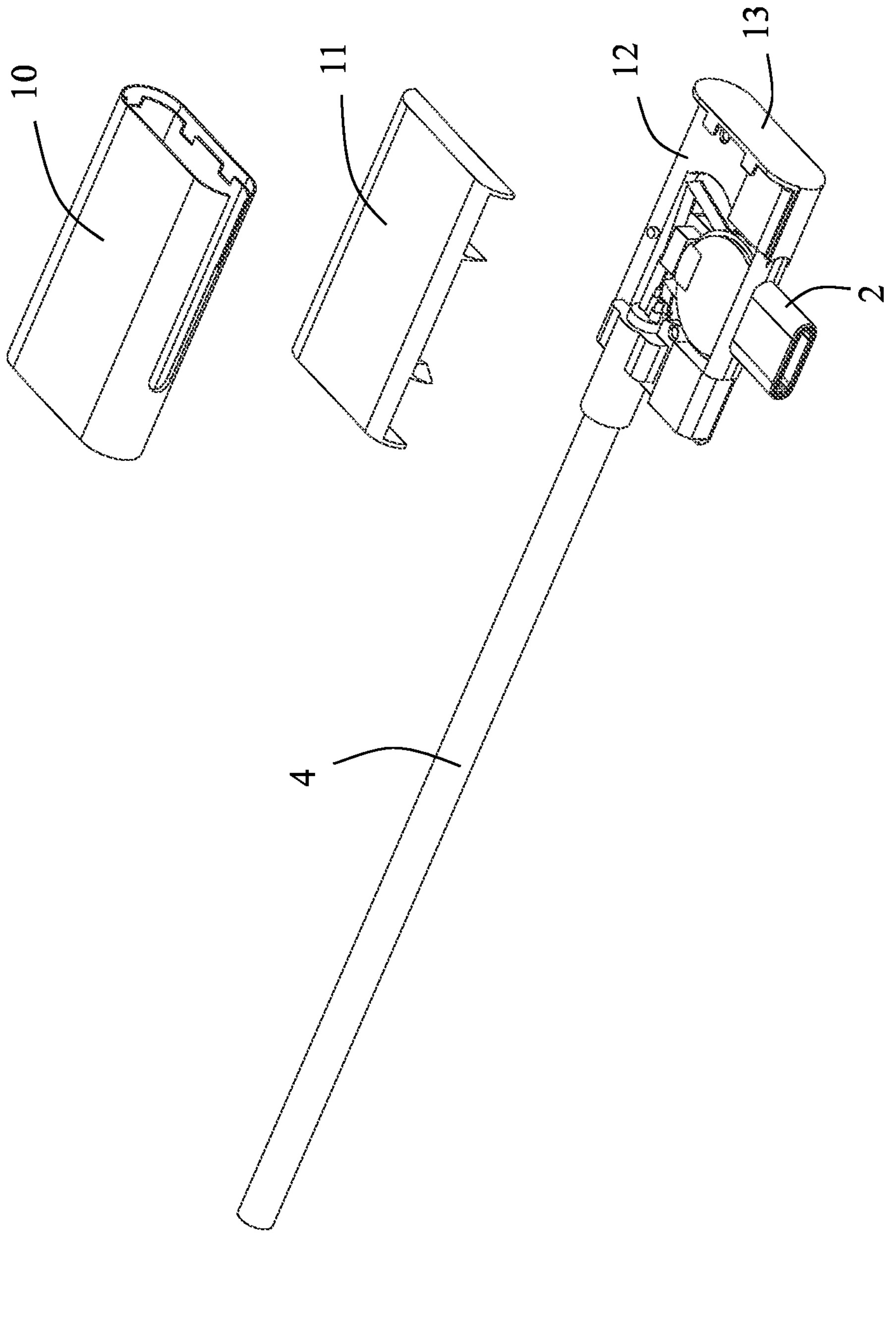
FIG. 3 is a partial perspective exploded view of FIG. 1.
Figure 4:
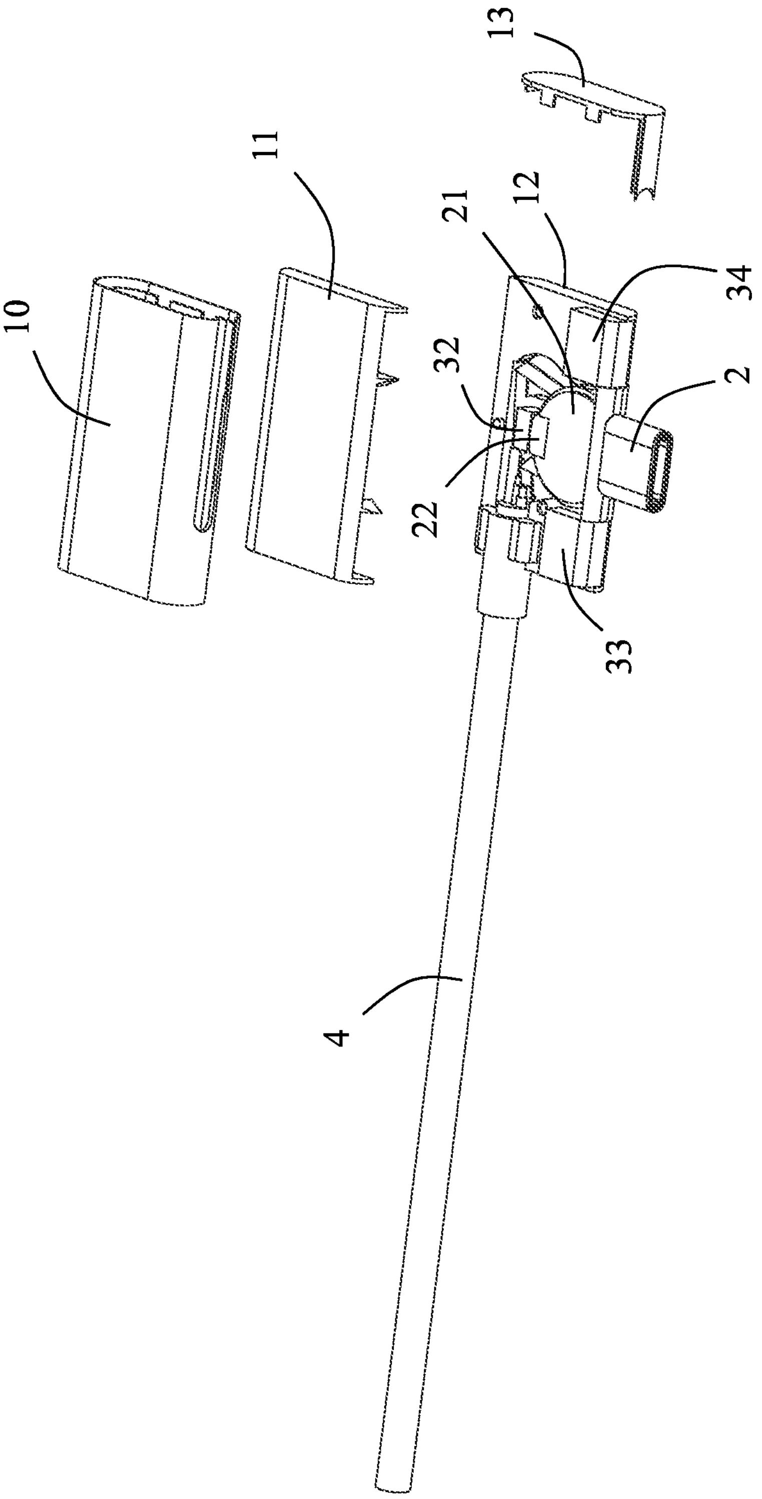
FIG. 4 is a further partial perspective exploded view of FIG. 3.
Figure 5:
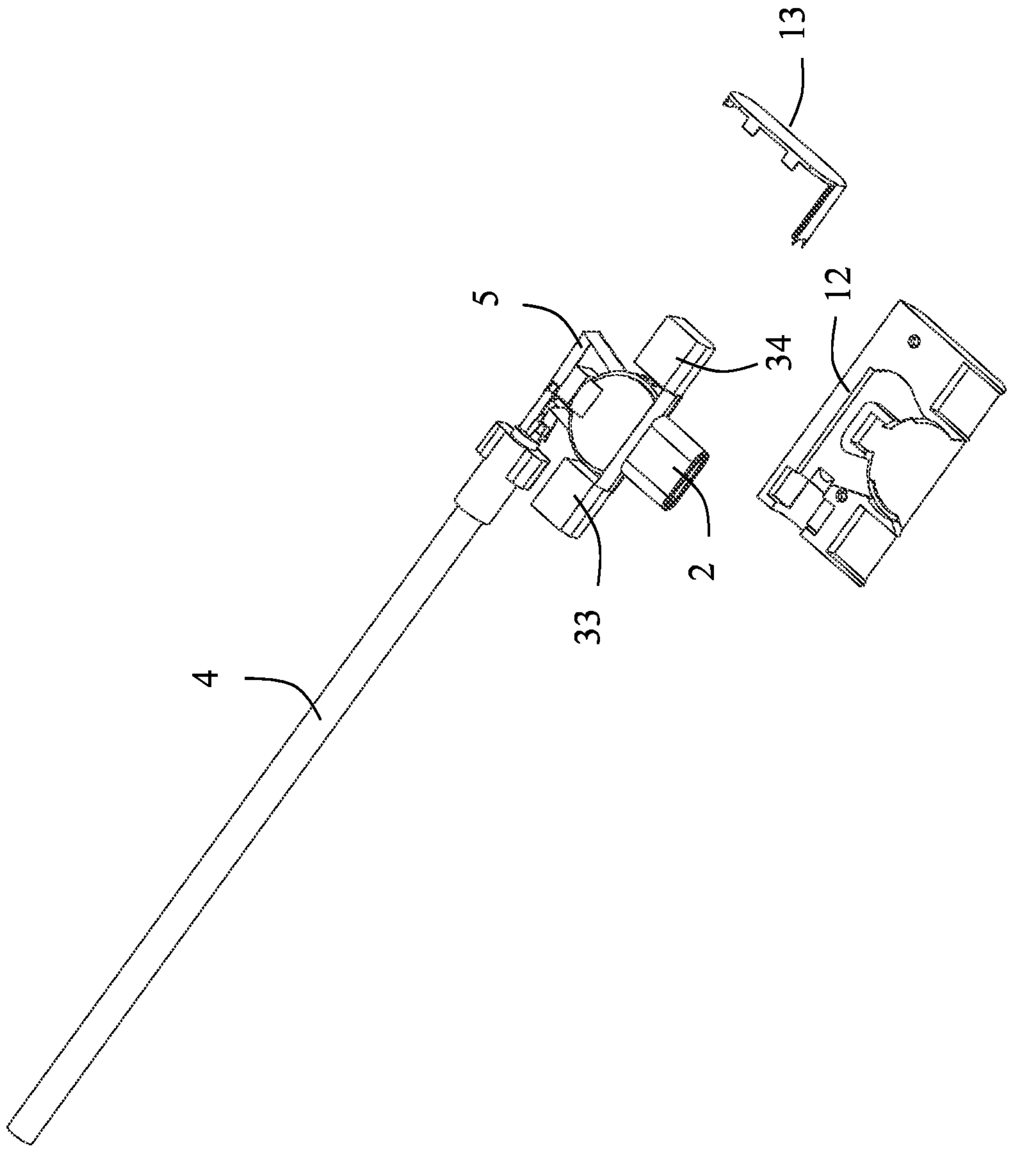
FIG. 5 is a further partial perspective exploded view after removing part of a housing in FIG. 4.

Referring to FIG. 1 and FIG. 2, the slot 100 includes a first slot 101 on one side of the electrical connector 23 and a second slot 102 on another side of the electrical connector 23. The first slot 101 and the second slot 102 are configured to provide a space for the electrical connector 23 to rotate left and right.

Figure 6:
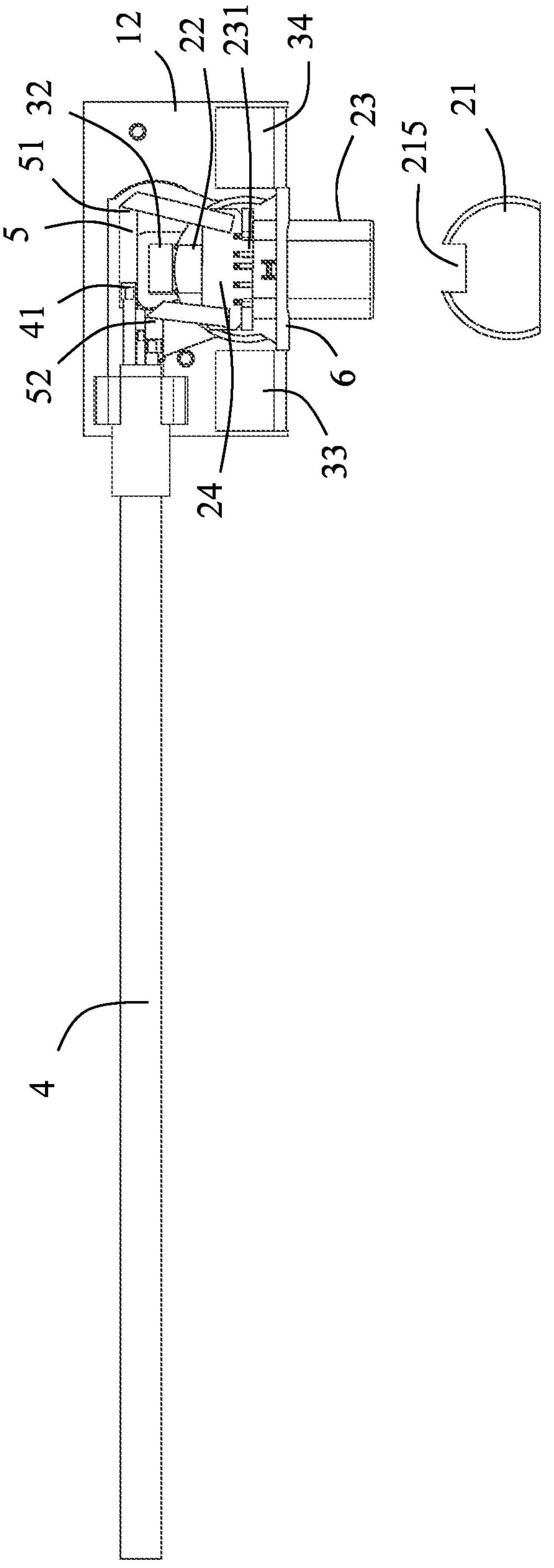
FIG. 6 is atop view after removing part of the housing in FIG. 4 and separating a rotating body.
Figure 7:
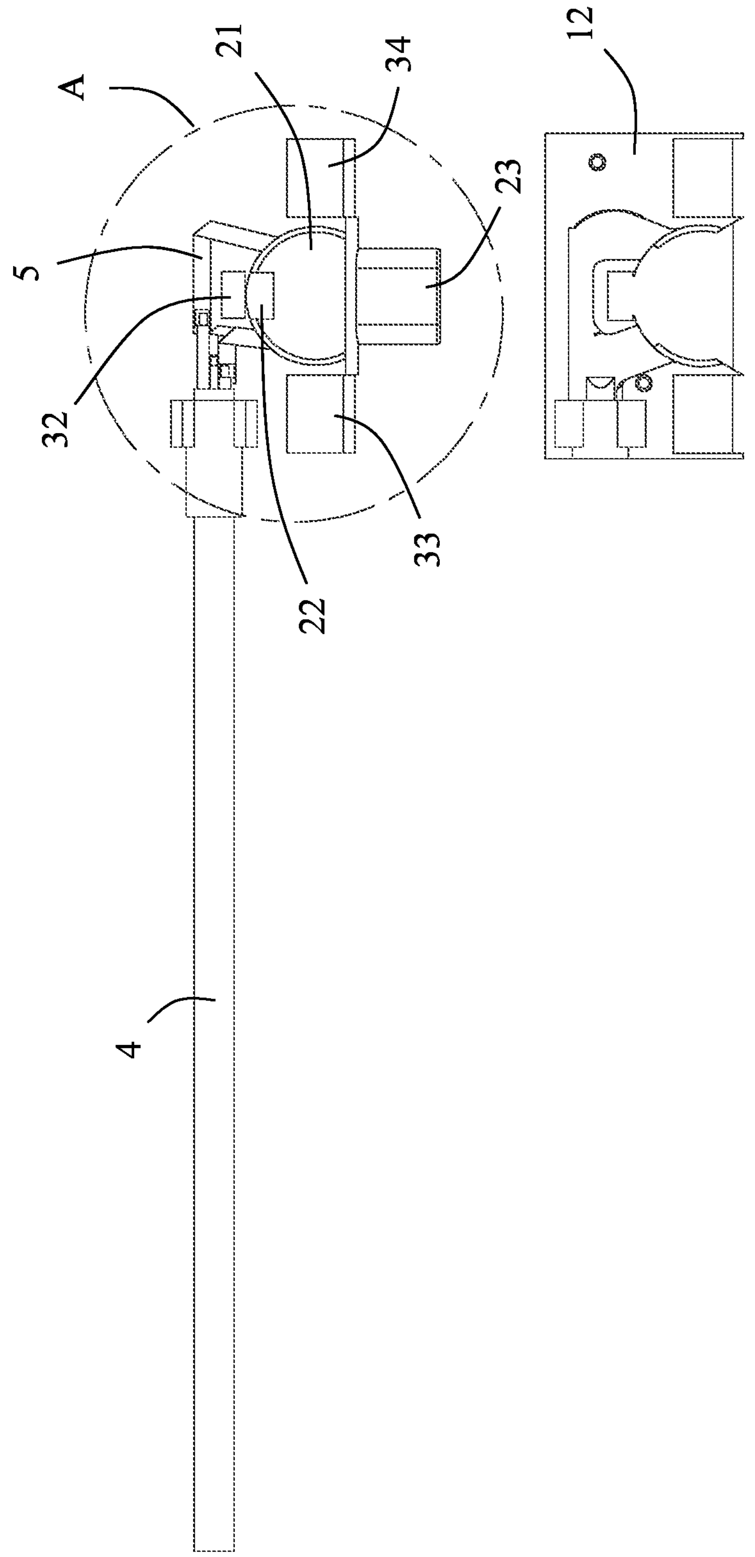
FIG. 7 is a top view after removing part of the housing in FIG. 4 and separating a second housing.

Referring to FIG. 6, the electrical connector assembly further includes a dust cover 6 sleeved on the electrical connector 23 and located inside the slot 100 along the second direction A2-A2. The dust cover 6 is accommodated in the housing 1. In an embodiment of the present disclosure, the dust cover 6 is a foam. The dust cover 6 is abutted against the flat surface 212 of the rotating body 21 to prevent external dust from entering an interior of the electrical connector assembly, so as to play a dustproof function.

The electrical connector assembly further includes a second magnetic attraction element disposed in the housing 1 and attracted to the first magnetic attraction element. In an embodiment of the present disclosure, the second magnetic attraction element is the second magnet 32. It is understandable to those skilled in the art that when the first magnet 22 and the second magnet 32 attract each other, two polarities of the first magnet 22 and the second magnet 32 approaching each other are different. Of course, it is understandable to those skilled in the art that, in order to achieve mutual attraction, one of the first magnetic attraction element and the second magnetic attraction element may be configured as a magnet, and a remaining one of the first magnetic attraction element and the second magnetic attraction element is configured as an iron. At this time, the polarity of the magnet does not need to be considered.

The plurality of magnets include a third magnet 33 and a fourth magnet 34 disposed in the housing 1. The second magnet 32 is configured to attract the first magnet 22 to automatically rotate the connector rotating unit 2 back to an original/normal position (i.e., a reset position) after the connector rotating unit 2 is rotated. The arcuate surface 221 of the first magnet 22 faces the second magnet 32. The second magnet 32 is provided with a vertical surface 321 which is attracted to the arcuate surface 221. The first magnet 22 and the second magnet 32 are located between the second connection portion 512 of the first flexible flat wire 51 and the fourth connection portion 522 of the second flexible flat wire 52 so as to save space.

The third magnet 33 and the fourth magnet 34 are located on two sides (e.g., left and right sides) of the rotating body 21, respectively. Both the third magnet 33 and the fourth magnet 34 repel the second magnet 32 to ensure that the magnets are positioned in parallel. The third magnet 33 and the fourth magnet 34 are configured to be attracted to a magnetic attraction element (e.g., a magnet or an iron) of a mating device, so as to improve the mating reliability.

Figure 8:
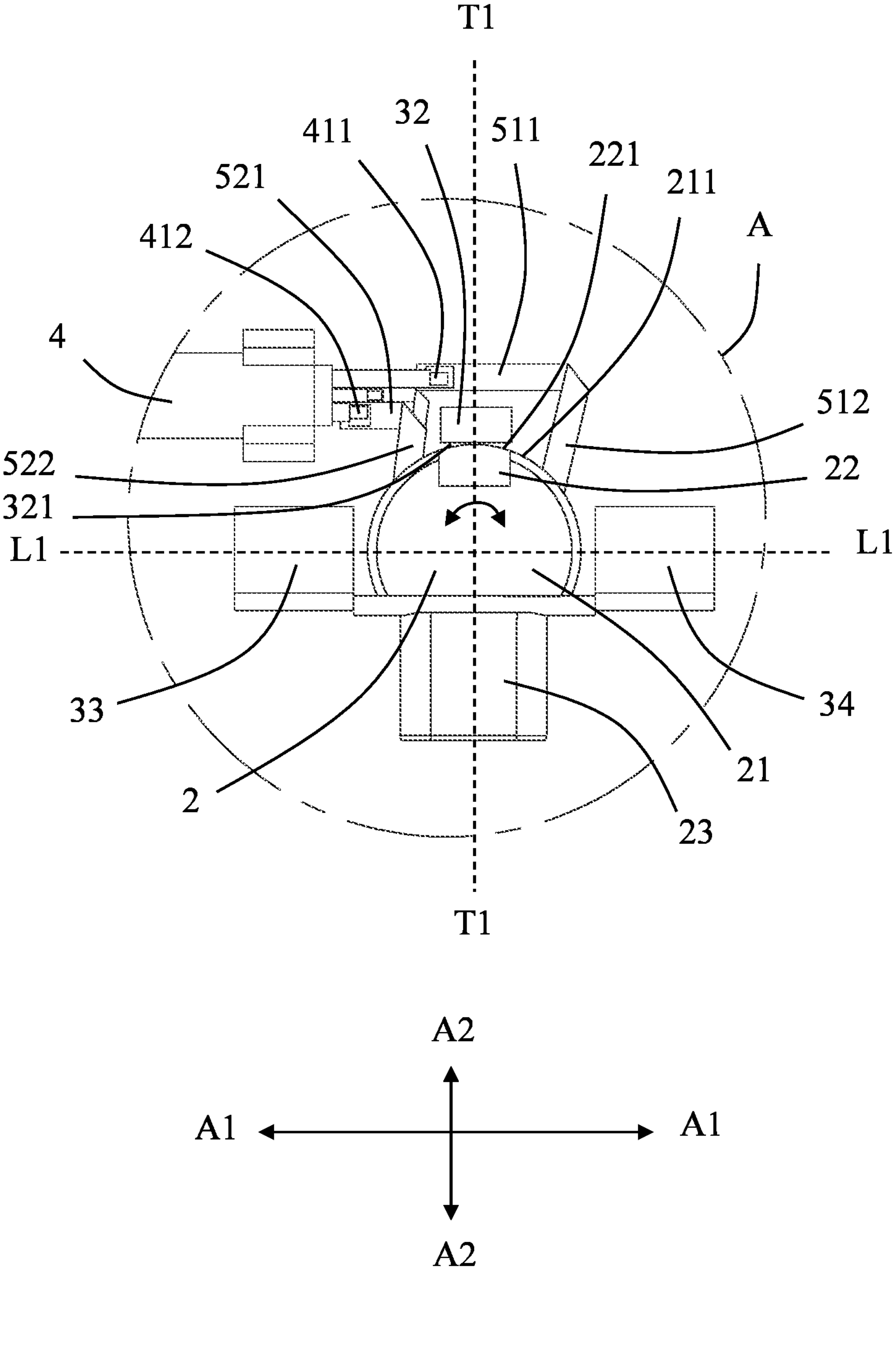
FIG. 8 is a partial enlarged view of a circled portion A in FIG. 7.
Figure 9:
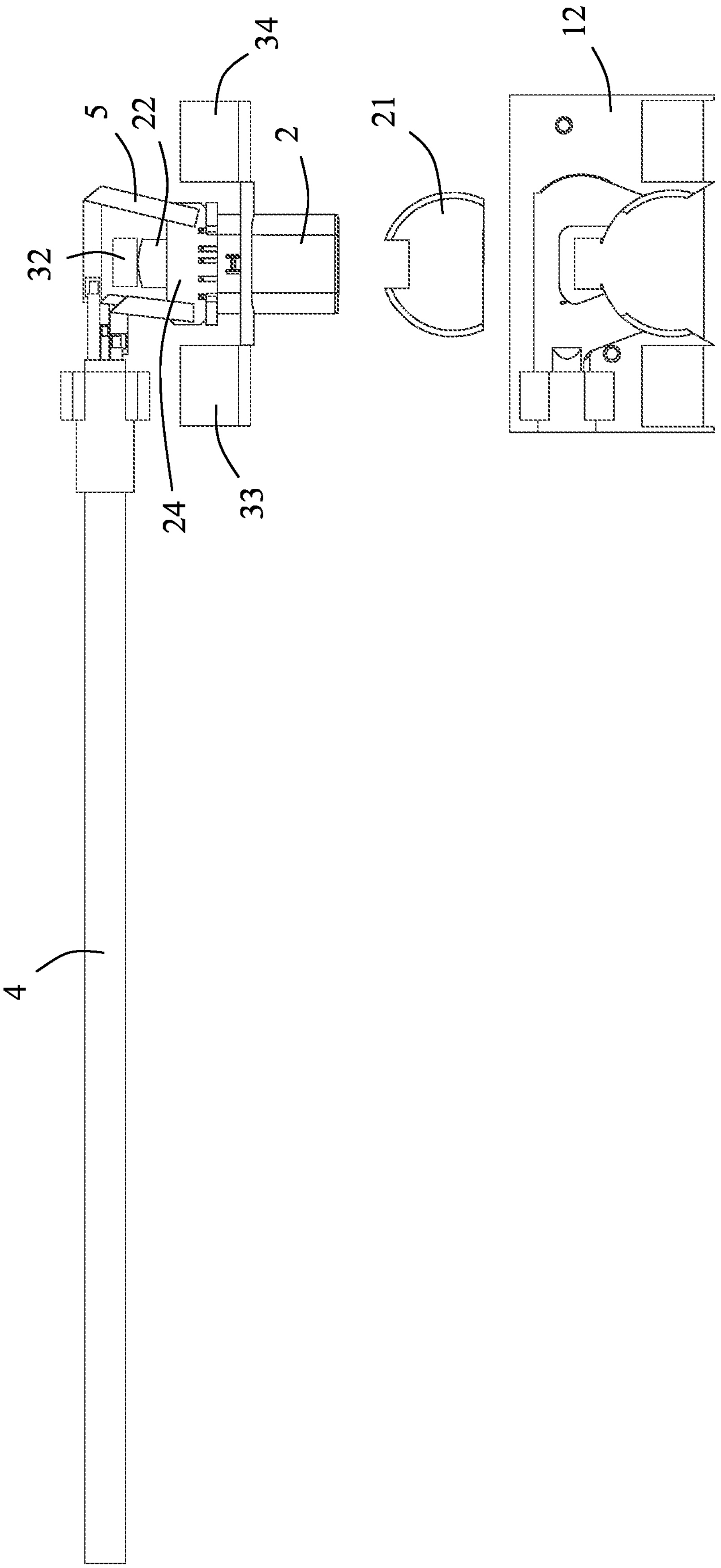
FIG. 9 is a top view after removing part of the housing in FIG. 4 and separating the rotating body and the second housing.

Referring to FIG. 8, in the embodiment shown in the present disclosure, the third magnet 33 and the fourth magnet 34 are arranged at intervals along the first direction A1-A1. The first magnet 22 and the second magnet 32 are located on a same side (e.g., an upper side) of the third magnet 33 and the fourth magnet 34 along the second direction A2-A2. The first magnet 22 and the second magnet 32 are located on a center vertical line T1-T1 which is perpendicular to a connecting line L1-L1 of the third magnet 33 and the fourth magnet 34. In this way, the magnetic attraction function of the first magnet 22 and the second magnet 32 can be optimized, and external interference can be reduced.

In the embodiment shown in the present disclosure, the first housing 11 is provided with a plurality of first holding grooves 110. The second housing 12 is provided with a plurality of second holding grooves 120. The plurality of first holding grooves 110 cooperate with the plurality of second holding grooves 120 to hold the first magnetic attraction element, the third magnet 33 and the fourth magnet 34.

Figure 12:
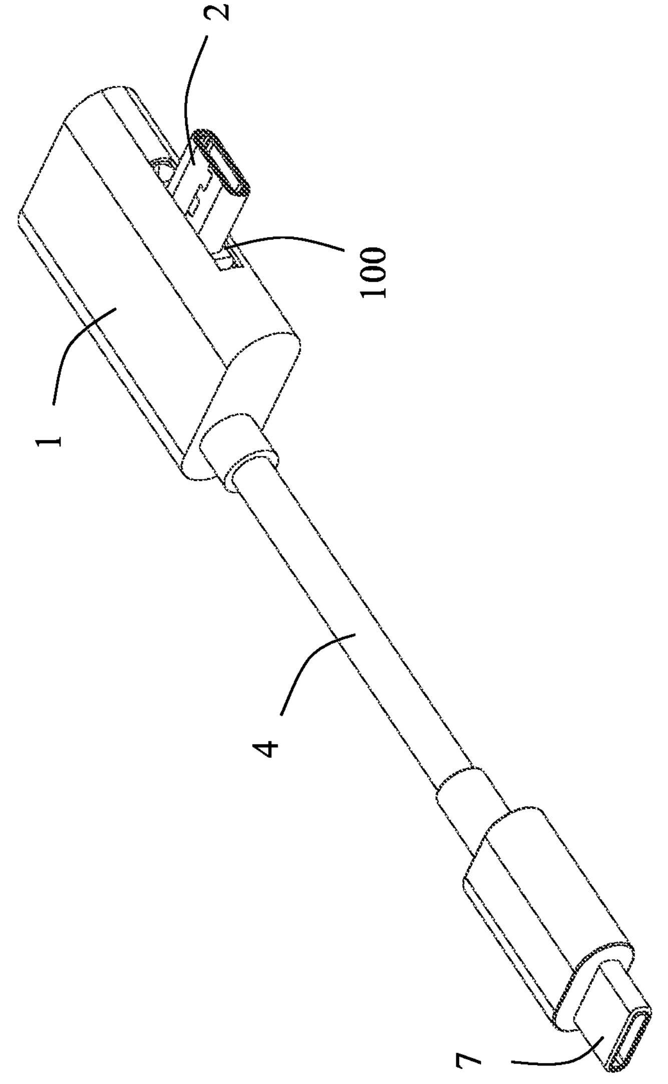
FIG. 12 is a schematic perspective view of the electrical connector assembly in accordance with another embodiment of the present disclosure.
Figure 13:
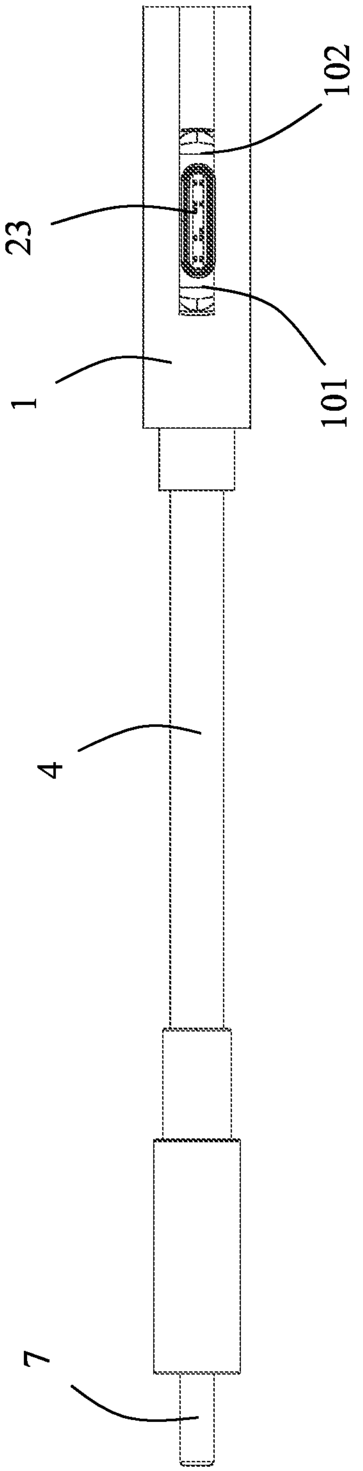
FIG. 13 is a front view of FIG. 12.

FIGS. 12 and 13 show an electrical connector assembly in accordance with a second embodiment of the present disclosure, wherein the electrical connector assembly in the second embodiment is similar in structure to the electrical connector assembly in the first embodiment. The main differences between the two are that: in the second embodiment, the electrical connector assembly further includes another electrical connector 7 connected to the other end of the cable 4; and the another electrical connector 7 is electrically connected to the electrical connector 23 through the cable 4, the flexible flat wire 5 and the built-in circuit board 24. In the embodiment of the present disclosure, the another electrical connector 7 may be a USB Type C plug, a USB Type A plug, a Micro USB plug, an HDMI plug, a DisplayPort plug, a Thunderbolt plug, or the like.

Compared with the prior art, the present disclosure is provided with a first magnetic attraction element and a second magnetic attraction element. The connector rotating unit 2 is rotatable between an original/normal position and a rotated position. When no external force is applied, the connector rotating unit 2 is located in the original/normal position; when the external force is applied, the connector rotating unit 2 is driven to rotate from the original/normal position to the rotated position; and when the external force is released, under action of a magnetic force generated by mutual attraction between the first magnetic attraction element and the second magnetic attraction element, the connector rotating unit 2 rotates from the rotated position back to the original/normal position. In other words, the second magnetic attraction element is configured to attract the first magnetic attraction element to automatically rotate the connector rotating unit 2 back to the original/normal position after the external force is released, which simplifies the structure and improves the user experience.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector assembly, comprising:

a housing;

a connector rotating unit, the connector rotating unit being rotatable relative to the housing under action of an external force, the connector rotating unit comprising a rotating body, a first magnetic attraction element fixed to the rotating body, and an electrical connector fixedly connected to the rotating body, the electrical connector at least partially extending beyond the housing; and a second magnetic attraction element provided in the housing, the second magnetic attraction element being configured to be attracted to the first magnetic attraction element to rotate the connector rotating unit back to an original position after the connector rotating unit is rotated and the external force is released;

wherein the electrical connector assembly further comprises a cable, a built-in circuit board and a plurality of flexible flat wires; the cable comprises a plurality of conductive portions;

wherein the plurality of flexible flat wires comprise a first flexible flat wire and a second flexible flat wire, the plurality of conductive portions comprise a first conductive portion and a second conductive portion;

the first flexible flat wire comprises a first connection portion connected to the first conductive portion and a second connection portion connected to the built-in circuit board; the second connection portion is connected to the first connection portion in a folded manner so that the second connection portion and the first connection portion are located in different planes;

the second flexible flat wire comprises a third connection portion connected to the second conductive portion and a fourth connection portion connected to the built-in circuit board; the fourth connection portion is connected to the third connection portion in a folded manner so that the fourth connection portion and the third connection portion are located in different planes.

2. The electrical connector assembly according to claim 1, wherein the first magnetic attraction element is a first magnet or an iron, and the second magnetic attraction element is a second magnet.

3. The electrical connector assembly according to claim 2, wherein the first magnet comprises an arcuate surface facing the second magnet and being attracted to the second magnet; and wherein the second magnet comprises a vertical surface which is attracted to the arcuate surface.

4. The electrical connector assembly according to claim 1, wherein the rotating body defines a groove in which the first magnetic attraction element is detachably installed.

5. The electrical connector assembly according to claim 1, wherein the connector rotating unit comprises a built-in circuit board, the electrical connector comprises a plurality of conductive terminals, the plurality of conductive terminals comprise a first row of conductive terminals and a second row of conductive terminals, the built-in circuit board is clamped between the first row of conductive terminals and the second row of conductive terminals, and the first row of conductive terminals and the second row of conductive terminals are electrically connected to the built-in circuit board.

6. The electrical connector assembly according to claim 1, wherein one end of each flexible flat wire is electrically connected to a corresponding conductive portion, and another end of each flexible flat wire is electrically connected to the built-in circuit board.

7. The electrical connector assembly according to claim 1, wherein the first magnetic attraction element and the second magnetic attraction element are located between the second connection portion and the fourth connection portion.

8. The electrical connector assembly according to claim 1, wherein the housing defines a slot extending in a first direction, the electrical connector passes through the slot in a second direction perpendicular to the first direction, the slot comprises a first slot on one side of the electrical connector and a second slot on another side of the electrical connector, and the first slot and the second slot are configured to provide a space for rotation of the electrical connector.

9. The electrical connector assembly according to claim 8, further comprising a dust cover sleeved on the electrical connector and located inside the slot along the second direction; wherein the dust cover is accommodated in the housing.

10. The electrical connector assembly according to claim 1, further comprising a third magnet and a fourth magnet which are located in the housing and located on both sides of the rotating body, respectively;

wherein both the third magnet and the fourth magnet repel the second magnetic attraction element; and the third magnet and the fourth magnet are configured to be attracted to a magnetic attraction element of a mating device.

11. An electrical connector assembly, comprising:

a housing;

a connector rotating unit, the connector rotating unit being rotatable relative to the housing under action of an external force, the connector rotating unit comprising a rotating body, a first magnetic attraction element fixed to the rotating body, and an electrical connector fixedly connected to the rotating body, the electrical connector at least partially extending beyond the housing; and a second magnetic attraction element provided in the housing, the second magnetic attraction element being configured to be attracted to the first magnetic attraction element to rotate the connector rotating unit back to an original position after the connector rotating unit is rotated and the external force is released;

wherein the electrical connector assembly further comprises a third magnet and a fourth magnet which are located in the housing and located on both sides of the rotating body, respectively;

wherein both the third magnet and the fourth magnet repel the second magnetic attraction element; and the third magnet and the fourth magnet are configured to be attracted to a magnetic attraction element of a mating device.

12. The electrical connector assembly according to claim 11, wherein the third magnet and the fourth magnet are spaced apart from each other, both the first magnetic attraction element and the second magnetic attraction element are located on a same side of the third magnet and the fourth magnet, and the first magnetic attraction element and the second magnetic attraction element are located at a center vertical line which is perpendicular to a connecting line of the third magnet and the fourth magnet.

13. An electrical connector assembly, comprising:

a housing defining a slot extending in a first direction;

a connector rotating unit, the connector rotating unit being rotatable relative to the housing under action of an external force, the connector rotating unit comprising a rotating body, a first magnetic attraction element and an electrical connector fixedly connected to the rotating body, the electrical connector at least partially passing through the slot so as to extend beyond the housing in a second direction perpendicular to the first direction; and a second magnetic attraction element provided in the housing;

wherein the connector rotating unit is rotatable between an original position and a rotated position; when no external force is applied, the connector rotating unit is located in the original position; when the external force is applied, the connector rotating unit is driven to rotate from the original position to the rotated position; and when the external force is released, under action of a magnetic force generated by mutual attraction between the first magnetic attraction element and the second magnetic attraction element, the connector rotating unit rotates from the rotated position back to the original position;

wherein the electrical connector assembly further comprises a cable, a built-in circuit board and a plurality of flexible flat wires; the cable comprises a plurality of conductive portions;

wherein the plurality of flexible flat wires comprise a first flexible flat wire and a second flexible flat wire, the plurality of conductive portions comprise a first conductive portion and a second conductive portion;

the first flexible flat wire comprises a first connection portion connected to the first conductive portion and a second connection portion connected to the built-in circuit board; the second connection portion is connected to the first connection portion in a folded manner so that the second connection portion and the first connection portion are located in different planes;

the second flexible flat wire comprises a third connection portion connected to the second conductive portion and a fourth connection portion connected to the built-in circuit board; the fourth connection portion is connected to the third connection portion in a folded manner so that the fourth connection portion and the third connection portion are located in different planes.

14. The electrical connector assembly according to claim 13, wherein the first magnetic attraction element is a first magnet or an iron, and the second magnetic attraction element is a second magnet.

15. The electrical connector assembly according to claim 14, wherein the first magnet comprises an arcuate surface facing the second magnet and being attracted to the second magnet; and wherein the second magnet comprises a vertical surface which is attracted to the arcuate surface.

16. The electrical connector assembly according to claim 13, wherein the rotating body defines a groove in which the first magnetic attraction element is detachably installed.

17. The electrical connector assembly according to claim 13, wherein the connector rotating unit comprises a built-in circuit board, the electrical connector comprises a plurality of conductive terminals, the plurality of conductive terminals comprise a first row of conductive terminals and a second row of conductive terminals, the built-in circuit board is clamped between the first row of conductive terminals and the second row of conductive terminals, and the first row of conductive terminals and the second row of conductive terminals are electrically connected to the built-in circuit board.

18. The electrical connector assembly according to claim 13, wherein one end of each flexible flat wire being is electrically connected to a corresponding conductive portion, and another end of each flexible flat wire is electrically connected to the built-in circuit board.

19. The electrical connector assembly according to claim 13, further comprising a dust cover sleeved on the electrical connector and located inside the slot along the second direction; wherein the dust cover is accommodated in the housing.

20. The electrical connector assembly according to claim 13, further comprising a third magnet and a fourth magnet which are located in the housing and located on both sides of the rotating body, respectively;

wherein both the third magnet and the fourth magnet repel the second magnetic attraction element; and the third magnet and the fourth magnet are configured to be attracted to a magnetic attraction element of a mating device.

* * * * *